C. P. HIDDEN.
BATTERY SEPARATOR.
APPLICATION FILED AUG. 5, 1910.

1,132,183.  Patented Mar. 16, 1915.

Witnesses:
Waldo M. Chapin
James D'Antonio

Inventor
Charles P. Hidden

UNITED STATES PATENT OFFICE.

CHARLES P. HIDDEN, OF NEW YORK, N. Y.

BATTERY-SEPARATOR.

1,132,183. Specification of Letters Patent. Patented Mar. 16, 1915.

Application filed August 5, 1910. Serial No. 575,814.

*To all whom it may concern:*

Be it known that I, CHARLES P. HIDDEN, a citizen of the United States, residing at New York city, in the borough of Manhattan and State of New York, have invented certain new and useful Improvements in Battery-Separators, of which the following is a full, clear, and exact description.

This invention relates to battery separators, and has for its object the production of an article which is adapted to meet all the requirements that a good battery separator should possess, while at the same time being substantially free from any of the objectionable characteristics of separators as heretofore produced.

My separator while intended primarily for storage batteries, is adapted for use in electrolytic cells and for various other purposes. Up to the present time great difficulty has been experienced in preventing the active material from flaking off from the electrodes. Various types of separators have been designed to prevent this deleterious action, such for example as perforated sheets of india rubber, wood, kaolin, porcelain, blotting paper, and the like. The perforated sheets fail to accomplish the desired object by reason of the fact that the openings therethrough are usually too large; it having been heretofore substantially impossible to produce at any reasonable cost, a satisfactory separator of this type. Wood separators, while adapted initially to prevent the active material from becoming displaced, deteriorate rapidly in the battery; rotting and becoming unfit for the purpose for which they are intended. Kaolin and porcelain plates are brittle and the pores thereof are subject to a clogging action by the loose active material; since the pores which traverse plates of this character necessarily wend their way through the plate or slab through very devious and hence relatively long paths, and as the cross-section of such pores is obviously very small, the resistance offered to the current when passing through the electrolyte contained in such "filamentary" conduits is necessarily considerable. Blotting paper and like material becomes decomposed and also, for reasons similar to those just stated, offers considerable resistance. I have devised a separator which is adapted to efficiently retain the active material in place; offers substantially a minimum of resistance to the passage of current therethrough; is cheap to manufacture; durable, strong, and is adapted to conduct relatively large quantities of fresh electrolyte directly up to the active material.

Other objects of my invention will be hereinafter set forth.

Figure 1:
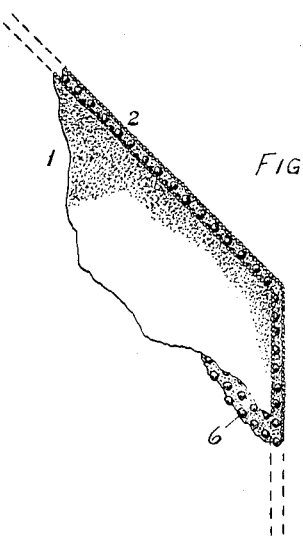
Figure 2:
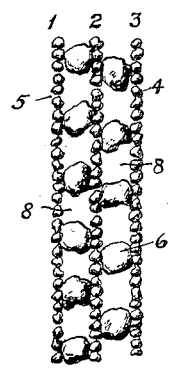
Figure 3:
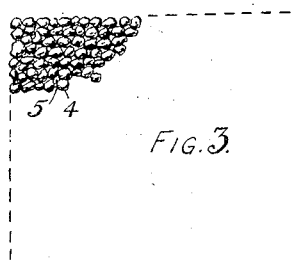
Figure 4:

In the accompanying drawing which forms a part hereof: Figure 1 is a perspective view of a fragment of one corner of a separator plate constructed in accordance with the principles of my invention. Fig. 2 is a detail section of the plate drawn to an enlarged scale, showing the arrangement of the various sized particles which compose the same. Fig. 3 is a fragment of one corner of the plate drawn to an enlarged scale in order to show the interstices between the particles. Fig. 4 is a section of one of the particles showing the film or coating of adhesive or binding material thereover.

Referring to the said drawings, in which like characters designate like parts throughout the several views, in Fig. 1 I have shown a two wall separator, the walls thereof respectively being designated 1 and 2; while in Fig. 2 is shown a three wall separator, the third wall being broadly designated 3. These walls are preferably fabrics composed of a large number of particles 4, which particles are secured together in such manner as to provide a plurality of minute interstices or pores 5 therebetween, the axis of each of said pores being substantially a right line and normal to the plane of the sheet. These walls are formed by coating particles of sand, saw dust, carbon, or other suitable material, with a thin film of substance 7, such for example as celluloid, rubber, or the like; which coating substance is normally insoluble in the electrolyte and which preferably has a lower coefficient of elasticity than, for example, glass, so that it may readily yield to the pressure exerted thereagainst by the active material of the battery; one method of forming a sheet or wall therefrom being to spread a single layer of, for example, celluloid coated particles of sand upon a platen, the particles being pressed down into place in such manner that a homogeneous and uniform layer of contacting particles is formed, the depth of such layer being that of a single particle. A solution of acetone or other solvent may now be sprayed or atomized over this layer of particles, in just sufficient quantity to cause the films of celluloid or the like to soften and adhere to each other. The sheet so formed is then dried and stripped from the platen.
I may cause particles to adhere by various means, such for example, as by heat; and it is not absolutely essential that the binding film be provided upon the particles since minute granules of fusible material for example can be strewn closely together over a plate and slightly fused to form a porous sheet; but I prefer, to use celluloid or rubber coated particles since the plate thereby is rendered somewhat flexible and resilient.
Having thus formed for example the wall 1, preferably markedly or distinctively larger particles or granules of a similar although not necessarily identical character, and coated or in some instances uncoated, may be strewn at spaced intervals over the surface of the sheet in the manner indicated in Figs. 1 and 2; such particles being in effect isolated from each other. The solvent may then again be atomized or sprayed over this arrangement or heat applied, and while the films on the small, or large and small particles, are still soft, a second sheet of like material may be applied thereover, the surface of which may also have been slightly sprayed with solvent. The sheets and separating particles 6 are then pressed lightly but firmly together and the adhesive coatings allowed to set. This arrangement obviously forms a sheet like conduit the walls of which are traversed by pores of uniform length. Frequently a two wall separator so formed and such as that shown in Fig. 1 will be found sufficient; but should it be desired to provide a greater bulk of electrolyte between the plates a three wall separator may be used, or a separator with as many walls as may be desired.

It is obvious that a structure formed like that for example shown in Figs. 1 and 2, will be very strong, since in cross section in either direction a truss-like formation will be found. The particles 4 may, for example, be 1/64th of an inch in diameter on an average, while the innumerable interstices therebetween will be yet smaller. Particles 6 may then be used having an approximate diameter of 3/64ths of an inch, and spaced from each other in any direction by between $\frac{1}{16}$ and $\frac{1}{8}$ of an inch. The small particles 4 are hence supported at points relatively very close to each other, and the mass of particles formed between a group of any three or four of the larger particles is therefore able to resiliently sustain a considerable pressure.
The electric current is adapted to flow directly through the very short channels or interstices 5 into a relatively large mass or bulk of electrolyte in the spaces 8; flowing successively through as many walls as may be provided and corresponding bodies of electrolyte to the active material of the adjoining electrode. As a result therefore my separator affords a minimum of resistance to the current passing therethrough and an abundance of fresh or strong electrolyte is supplied to the active material disposed upon the respective sides of the separator; the structure of which, being quite elastic, allows for expansion of the active material, while being both strong and flexible it will not be readily torn or burst. It is adapted to suitably withstand the action of the electrolyte and in short it admirably fulfils all of the requirements that a perfect separator should possess.

I particularly wish to point out that if by any chance some particles of active material should succeed in working through the interstices 5 of the outer plates, they would simply drop down between into the respective spaces 8 and thence down to the bottom of the cell, so that short circuiting cannot possibly occur through the separator; the central or interior partition separating loose particles of material from the positive plate from like particles from the negative plate.

I am aware that attempts have been made to form separators by causing to adhere together a mass of particles to form a thick and consequently substantially unyielding block, but separators so formed are subject to the objections that they cannot properly yield to the expanding active material in contact therewith, nor follow up the retreating active material when the latter contracts. Furthermore a substantially solid and thick plate or separator block does not permit of the free flow of electrolyte that is possible with my separator, preferably formed as it is of thin porous walls spaced apart to receive a relatively extended body of electrolyte therebetween. Again, the fact that the separator walls are thin reduces the internal electrical resistance of the battery or other device in which the separator is used, since the "filamentary conduits" through which the liquid passes to and from the active material are very short.

In certain of the claims appended hereto I have used the term "inherently porous," to differentiate the structure covered by such claims from structures comprising, for example, a rubber plate having perforations therein. Such a plate obviously is not inherently porous as are the sheets which constitute the walls of the herein described separator, since they are not incident to the fabric of which the walls are composed.

In the claims, where the term "conduit" is used, I intend that such term shall cover a passage or space of such size as will permit liquid, such as water, to flow therefrom by gravity when air can gain free admittance above said liquid and the latter can drain away from the separator without such interference by capillary action as will prevent in large measure, at least, such a flow of said liquid.

What I claim, is:

1. A storage battery separator comprising a layer of particles of insulating material contiguously arranged to form a thin sheet, said particles being united to each other at spaced points to provide minute interstices therebetween.

2. A storage battery separator comprising a single layer of particles of insulating material contiguously arranged to form a sheet, said particles being united to each other at spaced points to provide minute interstices therebetween.

3. A unitary separator comprising a plurality of thin flexible spaced porous walls united by connecting masses, the extent of which in either and both directions, measured lengthwise or crosswise of said separator, is less than the total thickness of said separator.

4. In a battery separator, integrally united particles disposed side by side to form a wall, portions of the peripheral surfaces of said particles being spaced from corresponding portions of adjoining particles to form pores extending through said walls, the axis of each of said pores being substantially a right line.

5. In a separator, a relatively large number of distinct elements of small breadth and thickness united together to form a porous wall, said elements having interstices therebetween constituting the pores of said wall, said wall being thin and resilient, a second thin porous wall, and means for spacing said walls apart to form a conduit therebetween.

6. A battery separator having thin resilient walls built up of separate elements the width and thickness of which are relatively small as compared to the length of the separator, said elements being united together and adapted to yield where placed under pressure by the expansion of active material of the battery, and spacing parts between portions at least of said walls, said walls being porous and the pores thereof extending substantially directly through said walls from side to side thereof and being constituted by the interstices between said elements.

7. A separator comprising a plurality of particles disposed to form spaced porous walls, and other particles united at spaced intervals to the opposed faces of said walls to stiffen and support said walls and to provide a conduit therebetween.

8. A separator comprising a resilient, flexible, integrally formed structure having inherently porous walls and one or more conduits therebetween, the pores in said walls being incident to the material thereof and extending from the outer faces of said separator in substantially right lines to said conduits.

9. A flexible separator consisting of united film coated masses disposed to afford pores and, in places, a conduit therebetween.

10. A separator comprising three parallel, and integrally united porous walls, the three walls being spaced apart from each other.

11. A separator comprising a plurality of porous walls and relatively isolated spacing masses secured between said walls, the extent of said masses in either and both directions, measured lengthwise or crosswise of said separator, is less than the total thickness of said separator.

12. A porous separator comprising a thin, fabricated, inherently porous sheet, the interstices incident to the fabric forming the pores of the separator, the walls of each of said pores being formed of films of elastic material.

13. A separator consisting of united film coated masses disposed to afford pores and also a conduit therebetween, said conduit being materially larger in cross-sectional area than said pores.

14. A flexible separator consisting of united film coated masses disposed to afford pores, and also a conduit therebetween, said conduit being materially larger in cross-sectional area than said pores.

15. A separator comprising a plurality of inherently porous walls and relatively isolated spacing and thrust supporting masses secured between said walls, said masses being of limited extent in any direction as compared with the over-all length of said separator and being spaced apart a distance exceeding the extent of said masses, measured in the direction of the said length of the separator.

16. A separator comprising three spaced, firmly united and inherently porous walls, the pores of which are incident to the material of which said walls are composed, said pores extending through said walls from side to side thereof and opening into the spaces between said walls, whereby an electric current can traverse said separator in substantially a right line.

17. A battery separator having yielding parts to coact with active material of the battery, said separator comprising pulverulent inert material resiliently united together by other material having a materially lower co-efficient of elasticity than glass, said particles being of different sizes, those of the larger size being, at least for the greater part thereof, spaced from said active material by particles of lesser size and providing relatively large circulation conduits through the interior of the separator as compared with the interstitial conduits between the particles adjacent the active material.

18. A battery separator formed by a porous mass of substantially integrally united pulverulent inert material comprising particles of markedly different size, those of larger size being disposed to form relatively large conduits in the mass as compared with the interstitial conduits between adjacent smaller particles.

19. A battery separator formed of a porous mass of pulverulent inert material comprising particles of markedly different size, the smaller particles, at least, being substantially integrally united together and the larger particles being disposed to afford relatively large conduits in said mass as compared to the size of the interstitial conduits between adjacent smaller particles.

20. A battery separator formed of a porous mass of pulverulent inert material comprising particles of markedly different size, some, at least, of said particles being substantially integrally united together to give definite form to said separator and the larger particles being disposed to afford relatively large conduits in said mass as compared to the size of the interstitial conduits between adjacent smaller particles.

21. A battery separator formed of a mass, parts of which are resilient and freely yielding when pressure is imposed thereon by the expansion of the active material of the battery, said mass comprising sand particles resiliently united together and having spaces therein into which the parts displaced by the active material may move.

22. A battery separator formed of a mass, parts of which are resilient and sufficiently flexible to freely yield when pressure is imposed thereon by the expansion of the active material of the battery, said mass comprising pulverulent inert material resiliently united together and having spaces therein into which the parts displaced by the active material may move.

23. An electro-chemical apparatus separator having yielding parts to co-act with active material of said apparatus, said separator comprising elements resiliently united together by binding films adapted to yield under the stress resulting from the expansion of said active material, said separator having therein spaces into which parts of said elements and films may move when displaced by said active material.

24. An electro-chemical apparatus separator having yielding parts to co-act with active material of said apparatus, said separator comprising elements so resiliently united together in sheet form as to yield under the stress resulting from the expansion of said active material, said separator having spaces therein into which parts of said elements may move when displaced by said active material.

In witness whereof, I subscribe my signature, in the presence of two witnesses.

CHARLES P. HIDDEN.

Witnesses:
   JAMES D. ANTONIO,
   WALDO M. CHAPIN.